United States Patent
Ponti

(10) Patent No.: US 12,060,182 B2
(45) Date of Patent: Aug. 13, 2024

(54) METHOD AND MACHINE FOR REALISING A BOX STARTING FROM A CARDBOARD BLANK AND FOR BOXING A PLURALITY OF ARTICLES WITH THE BOX

(71) Applicant: C.M.C. S.p.A., Cerbara-Citta' di Castello (IT)

(72) Inventor: Giuseppe Ponti, Cerbara-Citta' di Castello (IT)

(73) Assignee: C.M.C. S.p.A. (IT)

( * ) Notice: Subject to any disclaimer, the term of this patent is extended or adjusted under 35 U.S.C. 154(b) by 343 days.

(21) Appl. No.: 17/599,400

(22) PCT Filed: Apr. 1, 2020

(86) PCT No.: PCT/IB2020/053078
§ 371 (c)(1),
(2) Date: Sep. 28, 2021

(87) PCT Pub. No.: WO2020/202017
PCT Pub. Date: Oct. 8, 2020

(65) Prior Publication Data
US 2022/0041310 A1 Feb. 10, 2022

(30) Foreign Application Priority Data
Apr. 3, 2019 (IT) .................. 102019000004992

(51) Int. Cl.
*B65B 5/02* (2006.01)
*B65B 35/30* (2006.01)
(Continued)

(52) U.S. Cl.
CPC ............. *B65B 5/024* (2013.01); *B65B 35/30* (2013.01); *B65B 43/10* (2013.01); *B65B 49/02* (2013.01); *B65B 57/10* (2013.01)

(58) Field of Classification Search
CPC ......... B65B 5/024; B65B 35/30; B65B 43/10; B65B 49/02; B65B 57/10
See application file for complete search history.

(56) References Cited

U.S. PATENT DOCUMENTS

2015/0360433 A1* 12/2015 Feijen .................... B31B 50/74
493/162
2016/0193800 A1* 7/2016 Skinner ................. B29C 65/56
493/467
(Continued)

FOREIGN PATENT DOCUMENTS

CN       105620851 A  *  6/2016  .............. B65D 5/20
EP       05747440 A1     12/1993
(Continued)

*Primary Examiner* — Anne Marie Antonucci
*Assistant Examiner* — Luis G Del Valle
(74) *Attorney, Agent, or Firm* — Endurance Law Group PLC

(57) ABSTRACT

Plural articles are arranged in a reusable crate. A cardboard blank is selected in accordance with the volume of the arranged articles. The blank has a first and a second longitudinal score line defining a main portion and a first, a second, a third and a fourth lateral portion, the blank also having a first, a second, a third and a fourth incision that subdivide auxiliary portions into first parts and second parts. The blank and the reusable crate are reciprocally positioned, the bottom of the reusable crate then opened to release the articles onto the blank. The first, second, third and fourth lateral portions are folded towards the articles, with the respective first parts and second parts of the auxiliary portions folding one on another to form respective flaps abutting the group of articles.

11 Claims, 13 Drawing Sheets

(51) Int. Cl.
  *B65B 43/10* (2006.01)
  *B65B 49/02* (2006.01)
  *B65B 57/10* (2006.01)

(56) References Cited

U.S. PATENT DOCUMENTS

2019/0308761 A1* 10/2019 Provoost .................. B65B 43/24
2020/0100976 A1*  4/2020 Asbeck ..................... A61F 5/01

FOREIGN PATENT DOCUMENTS

| | | |
|---|---|---|
| FR | 2729921 A1 | 8/1968 |
| NL | 6603135 A | 9/1967 |
| WO | WO2016/076706 A1 | 5/2016 |
| WO | WO2016/157089 A1 | 10/2016 |
| WO | WO-2016157089 A1 * | 10/2016 ............. B65B 43/10 |

* cited by examiner

METHOD AND MACHINE FOR REALISING A BOX STARTING FROM A CARDBOARD BLANK AND FOR BOXING A PLURALITY OF ARTICLES WITH THE BOX

FIELD OF THE INVENTION

The present invention relates to the technical sector relating to the making of a box, to be used, for example, for boxing a plurality of articles.

In particular, the invention relates to a method and machine for realising a box starting from a cardboard blank and for boxing a plurality of articles with the box.

DESCRIPTION OF THE PRIOR ART

In general, a cardboard for packaging can be obtained from a blank, which can be used for various purposes, for example to form a cardboard box.

In this case, it is necessary first to realise fold lines, also known as score lines, which divide the cardboard for packaging into numerous portions so that they can be easily folded, preventing the formation of unappealing deformations and cracking of the cardboard for packaging, so as to obtain a cardboard box.

Thus, once the above-mentioned score lines have been realised on a cardboard for packaging, a blank is obtained, which can be easily folded about the score lines to obtain a cardboard box to pack articles in a simple and rapid way.

To date, a known method for realising a box starting from a cardboard blank and for boxing a plurality of articles with the box comprises steps of:

predisposing a reusable crate, having an openable bottom and a movable wall; arranging a plurality of articles to be boxed in the reusable crate and moving the movable wall to abut the articles of the plurality of articles so as to flank them to one another to form a group of articles: wherein the articles of the plurality of articles, when flanked to one another, define a rest base and a maximum height. The known method further comprises the steps of: detecting the value of the volume occupied by the plurality of articles internally of the reusable crate, on the basis of the dimensions of the rest base and the maximum height; on the basis of the detected volume, supplying a blank, in turn comprising: a first longitudinal score line and a second longitudinal score line, parallel to one another, and a first transversal score line and a second transversal score line parallel to one another and perpendicular to the first longitudinal score line and to the second longitudinal score line, so as to define, on the cardboard blank:

a central sector comprised between the first longitudinal score line and the second longitudinal score line; a first lateral sector comprised between the first longitudinal score line and a first longitudinal end of the cardboard blank; a second lateral sector comprised between the second longitudinal score line and a second longitudinal end of the cardboard blank.

The two longitudinal score lines and the two transversal score lines respectively cross, longitudinally and transversally, the cardboard blank and are distanced from one another in such a way as to identify, in the central sector:

a main portion, which is comprised between the first transversal score line and the second transversal score line and having dimensions such as to restingly receive the rest base of the group of articles; a first lateral portion and a second lateral portion, on opposite sides of the main portion with respect to the first transversal score line and the second transversal score line.

In this way, in the first lateral sector the following can be identified:

a third lateral portion comprised between the first transversal score line, the second transversal score line, the first longitudinal end of the cardboard blank for packaging and the first longitudinal score line; a first reinforcing portion and a second reinforcing portion, on opposite sides of the third lateral portion with respect to the first transversal score line and to the second transversal score line. Likewise, in the second lateral sector the following can be identified:

a fourth lateral portion which is comprised between the first transversal score line, the second transversal score line, the second longitudinal score line and the second longitudinal end of the cardboard blank; a third reinforcing portion and a fourth reinforcing portion, on opposite sides of the fourth lateral portion with respect to the first transversal score line and the second transversal score line.

The first lateral portion, the second lateral portion, the third lateral portion and the fourth lateral portion are such as to extend over all the maximum height of the group of articles so as to laterally contain the group of articles when received by the main portion.

The cardboard blank further comprises: a first incision on the first reinforcing portion starting from the point of intersection between the first longitudinal score line and the first transversal score line; a second incision on the second reinforcing portion starting from the point of intersection between the first longitudinal score line and the second transversal score line; a third incision on the third reinforcing portion starting from the point of intersection between the second longitudinal score line and the first transversal score line; a fourth incision on the fourth reinforcing portion starting from the point of intersection between the second longitudinal score line and the second transversal score line.

The first incision subdivides the first reinforcing portion into a first part and a second part of the first reinforcing portion; the second incision subdivides the second reinforcing portion into a first part and a second part of the second reinforcing portion; the third incision subdivides the third reinforcing portion into a first part and a second part of the third reinforcing portion; while the fourth incision subdivides the fourth reinforcing portion into a first part and a second part of the fourth reinforcing portion.

The method further comprises the steps of: folding the first lateral portion, the second lateral portion, the third lateral portion and the fourth lateral portion, with respect to the main portion, folding relative to one another the relative first part and the relative second part of each of the first reinforcing portion, second reinforcing portion, third reinforcing portion and fourth reinforcing portion, with respect to the first incision, second incision, third incision and fourth incision, forming, respectively, a first reinforcing flap, a second reinforcing flap, a third reinforcing flap and a fourth reinforcing flap to reinforce the box.

Subsequently, the known method comprises the step of applying the adhesive substance on the first reinforcing flap, the second reinforcing flap, the third reinforcing flap and the fourth reinforcing flap and causing the first reinforcing flap and the third reinforcing flap to adhere to the first lateral portion and causing the second reinforcing flap and the fourth reinforcing flap to adhere to the second lateral portion, with the objective of making the box obtained more rigid.

At this point, the group of articles contained in the reusable crate is arranged resting on the main portion, between the folded lateral portions, on which the reinforcing flaps have been glued, which will constitute the lateral walls of the box. Thus it is possible to box the group of articles with a box that is formed from a cardboard blank the dimensions of which are based on the value of the volume that the group of articles to be boxed will occupy.

In other words, once the value of the volume that the group of articles to be boxed will occupy inside the box is detected, the first and second longitudinal score line and the first and second transversal score line are realised, so that the main portion can receive the rest base, over the whole size thereof, and the lateral portions can extend over the maximum height of the group of articles to cover it laterally.

Thus the dimensions of the main portion and the lateral portions are established by an estimation, on the basis of the value of the volume which the group of articles will occupy inside the box, and this estimation might include a margin of error, as the main portion and the lateral portions might be oversized in order to obtain a box with slightly greater volume than what the plurality of articles will occupy.

This might lead to the formation, inside the box obtained, of empty spaces between the walls of the box and the group of articles.

These empty spaces might cause an undesired movement of the articles inside the box.

SUMMARY OF THE INVENTION

In the light of the above, the aim of the present invention consists in obviating the above-mentioned drawbacks.

The above aim is attained by a method for realising a box starting from a cardboard blank and for boxing a plurality of articles with the box according to claim 1 and by a machine for realising a box starting from a cardboard blank and for boxing a plurality of articles with the box according to claim 6.

Advantageously, during the step of folding the first lateral portion, the second lateral portion, the third lateral portion and the fourth lateral portion, with respect to the main portion, towards the group of articles arranged on the main portion, the relative first part and the relative second part of each of the first auxiliary portion, second auxiliary portion, third auxiliary portion and fourth auxiliary portion fold with respect to one another to form a first abutting flap, a second abutting flap a third abutting flap and a fourth abutting flap, which interpose between the group of articles and the lateral portions so as to abut the group of articles arranged on the main portion so as to reduce the movement thereof inside the box.

BRIEF DESCRIPTION OF THE DRAWINGS

Specific embodiments of the invention will be described in the following part of the present description, according to what is set down in the claims and with the aid of the appended tables of drawings, in which:

DESCRIPTION OF PREFERRED EMBODIMENTS

Figure 1:
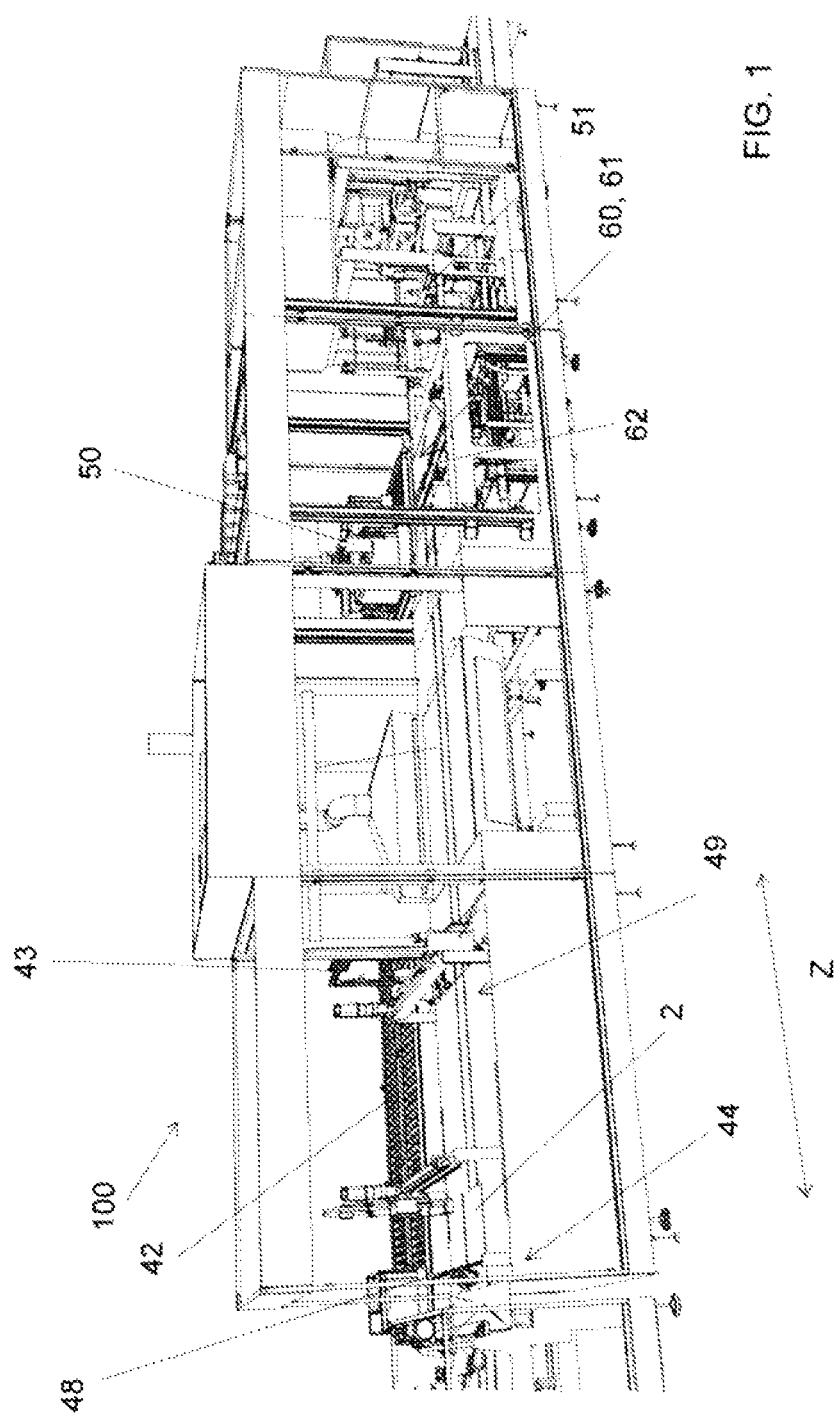
FIG. 1 is a perspective view of the machine for realising a box starting from a cardboard blank and for boxing a plurality of articles with the box, object of the present invention.

In the following reference is made to FIGS. 1, 5-8 and 13.

In the present description, it is specified that by cardboard blank (2) is meant a cardboard sheet profiled by die-cutting to give it a determined shape.

A method for realising a box (1) starting from a cardboard blank (2) and for boxing a plurality of articles (3) with the box (1), comprises steps of: predisposing a reusable crate (4), having an openable bottom (6) and a movable wall (7); arranging a plurality of articles (3) to be boxed in the reusable crate (4) and moving the movable wall (7) to abut the articles of the plurality of articles (3) so as to flank them to one another to form a group of articles (3a); the articles of the plurality of articles (3), when flanked to one another, defining a rest base (3b) and a maximum height (3c);

detecting the value of the volume (V) occupied by the group of articles (3a) internally of the reusable crate (4), on the basis of the dimensions of the rest base (3b) and the maximum height (3c); on the basis of the value of the volume (V) detected, infeeding a cardboard blank (2) comprising:

a first longitudinal score line (9) and a second longitudinal score line (10), parallel to one another, and a first transversal score line (11) and a second transversal score line (12), parallel to one another and perpendicular to the first longitudinal score line (9) and to the second longitudinal score line (10), so as to define, on the cardboard blank (2):

a central sector (13) comprised between the first longitudinal score line (9) and the second longitudinal score line (10); a first lateral sector (14) comprised between the first longitudinal score line (9) and a first longitudinal end (2a) of the cardboard blank (2); a second lateral sector (15) comprised between the second longitudinal score line (10) and a second longitudinal end (2b) of the cardboard blank (2).

The two longitudinal score lines (9, 10) and the two transversal score lines (11, 12) respectively cross, longitudinally and transversally, the cardboard blank (2) and are distanced from one another in such a way as to identify, in the central sector (13):

a main portion (16), which is comprised between the first transversal score line (11) and the second transversal score line (12) and having dimensions such as to restingly receive the rest base (3b) of the group of articles (3a); a first lateral portion (17) and a second lateral portion (18), on opposite sides of the main portion (16) with respect to the first transversal score line (11) and the second transversal score line (12).

In this way, in the first lateral sector (14) the following is identified:

a third lateral portion (19), which is comprised between the first transversal score line (11), the second transversal score line (12), the first longitudinal end (2a) of the cardboard blank (2) and the first longitudinal score line (9); a first auxiliary portion (20) and a second auxiliary portion (21), on opposite sides of the third lateral portion (19), with respect to the first transversal score line (11) and the second transversal score line (12).

Likewise, in the second lateral sector (15) the following is identified:

a fourth lateral portion (22) which is comprised between the first transversal score line (11), the second transversal score line (12), the second longitudinal score line (10) and the second longitudinal end (2b) of the cardboard blank (2); a third auxiliary portion (23) and a fourth auxiliary portion (24), on opposite sides of the fourth lateral portion (22) with respect to the first transversal score line (11) and the second transversal score line (12).

The first lateral portion (17), the second lateral portion (18), the third lateral portion (19) and the fourth lateral portion (22) are such as to extend over all the maximum height (3c) of the group of articles (3a) so as to laterally contain the group of articles (3a) when received by the main portion (16).

The cardboard blank (2) further comprises:

a first incision (25) on the first auxiliary portion (20) starting from the point of intersection between the first longitudinal score line (9) and the first transversal score line (11);

a second incision (26) on the second auxiliary portion (21) starting from the point of intersection between the first longitudinal score line (9) and the second transversal score line (12);

a third incision (27) on the third auxiliary portion (23) starting from the point of intersection between the second longitudinal score line (10) and the first transversal score line (11);

a fourth incision (28) on the fourth auxiliary portion (24) starting from the point of intersection between the second longitudinal score line (10) and the second transversal score line (12).

The first incision (25) subdivides the first auxiliary portion (20) into a first part (20a) and a second part (20b) of the first auxiliary portion (20); the second incision (26) subdivides the second auxiliary portion (21) into a first part (21a) and a second part (21b) of the second auxiliary portion (21); the third incision (27) subdivides the third auxiliary portion (23) into a first part (23a) and a second part (23b) of the third auxiliary portion (23); the fourth incision (28) subdivides the fourth auxiliary portion (24) into a first part (24a) and a second part (24b) of the fourth auxiliary portion (24).

The method further comprises the following steps:
reciprocally positioning the cardboard blank (2) and the reusable crate (4) so that the part of reusable crate (4) in which the group of articles (3a) is contained is located above the main portion (16);
opening the openable bottom (6) of the reusable crate (4) to release the group of articles (3a) on the main portion (16);
folding the first lateral portion (17), the second lateral portion (18), the third lateral portion (19) and the fourth lateral portion (22) with respect to the main portion (16) towards the group of articles (3a), with the relative first part (20a, 21a, 23a, 24a) and the relative second part (20b, 21b, 23b, 24b), of each of the first auxiliary portion (20), second auxiliary portion (21), third auxiliary portion (23) and fourth auxiliary portion (24), which fold with respect to the first incision (25), second incision (26), third incision (27) and fourth incision (28) so as to form, respectively, a first abutting flap (29), a second abutting flap (30), a third abutting flap (31) and a fourth abutting flap (32) so as to abut the group of articles (3a) received on the main portion (16) (see FIGS. 5-8).

The cardboard blank (2) in supply can be in a flat configuration.

Figure 2:
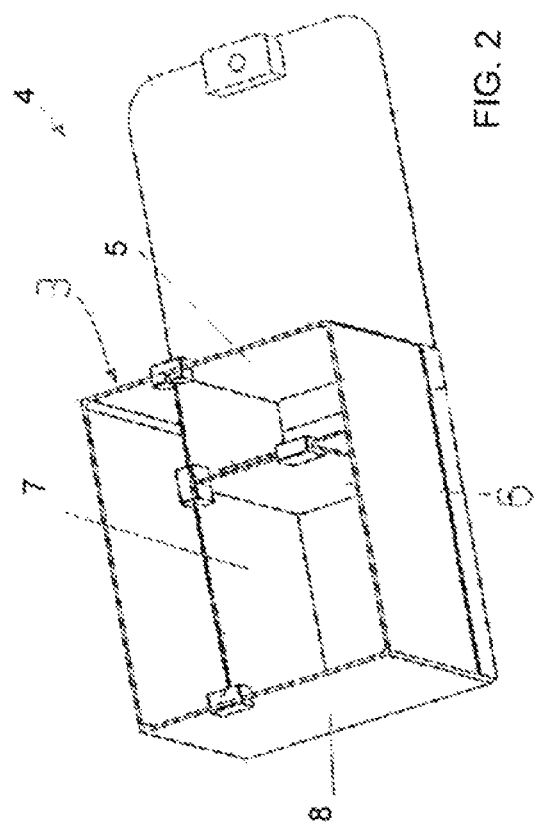
FIG. 2 is a perspective view of the reusable crate.

With particular reference to FIG. 2, the movable wall (7) can emerge from the bottom wall (6).

The reusable crate (4) can comprise an external wall (8).

Figure 3:
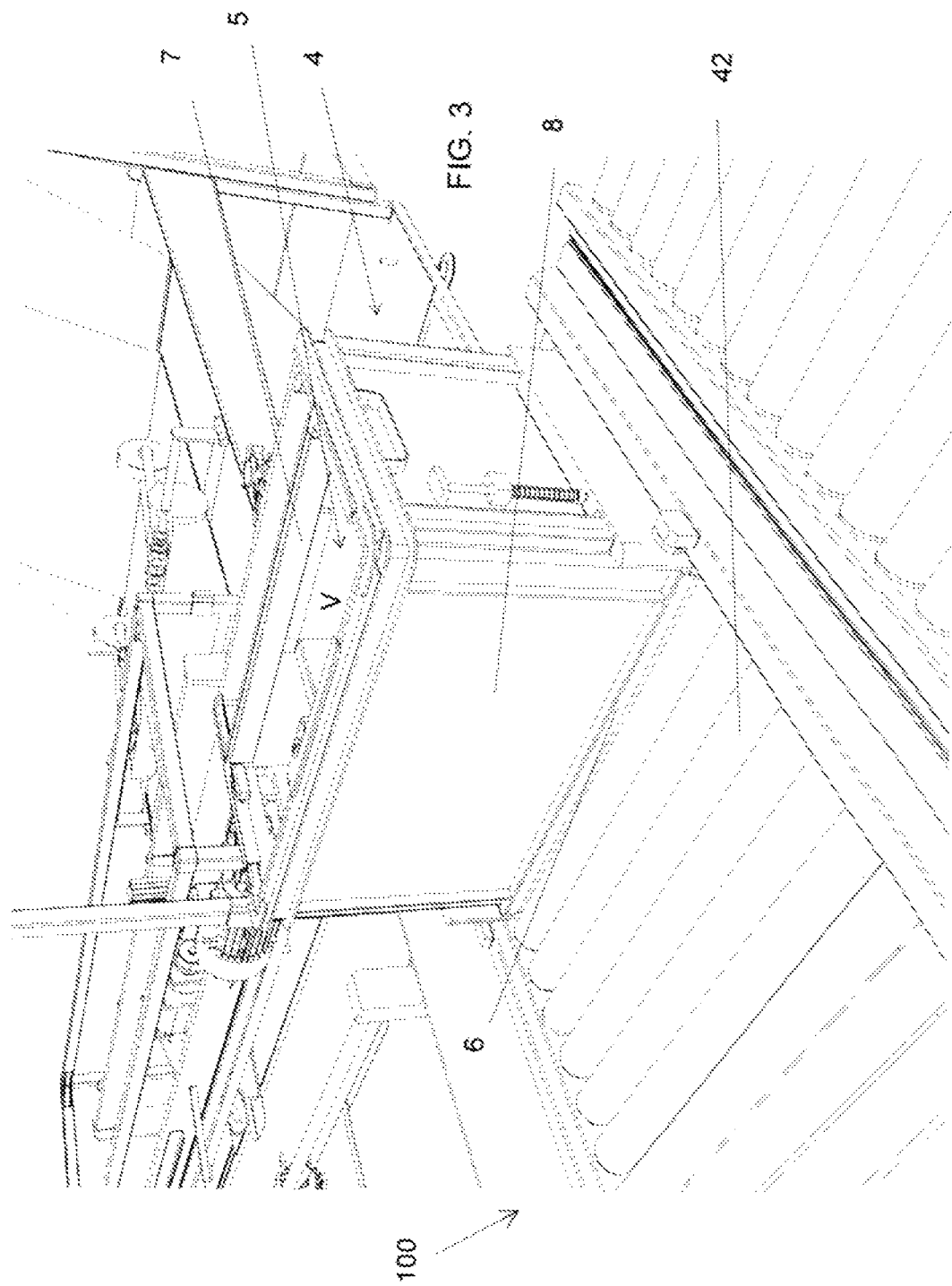
FIG. 3 is a perspective view illustrating a first step of the method for realising a box starting from a cardboard blank and for boxing a plurality of articles with the box, also an object of the present invention.

The external wall (8), the movable wall (7) and a part of the bottom wall (2) can identify a chamber (5) for containing the group of articles (3a) to be boxed (see FIGS. 2 and 3).

The first longitudinal score line (9) and the second longitudinal score line (10) can longitudinally cross the cardboard blank (2), from the first longitudinal end (2a) to the second longitudinal end (2b).

The first longitudinal end (2a) and the second longitudinal end (2b) can be the lateral ends of the cardboard blank (2).

Figure 13:
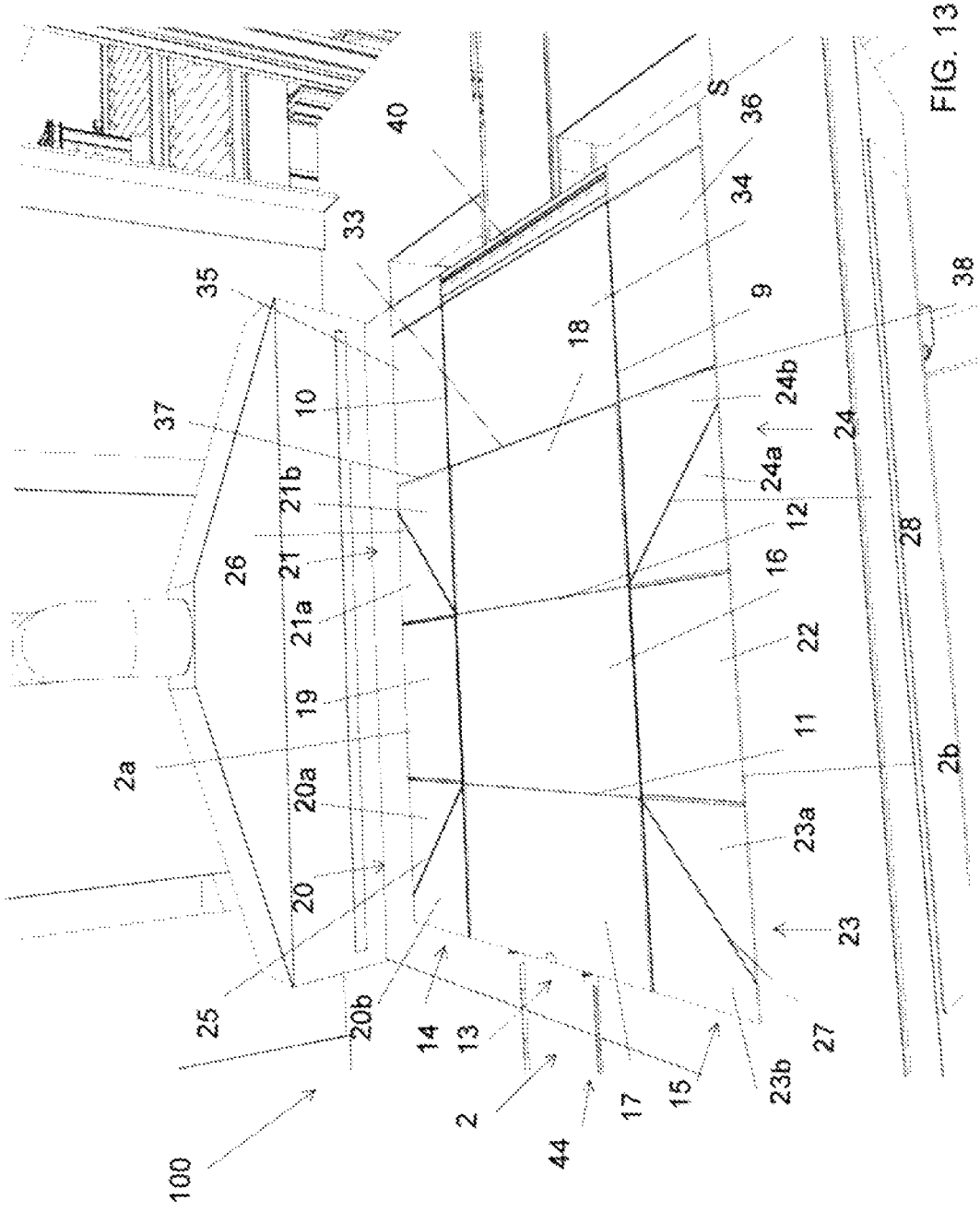
FIG. 13 is a perspective view illustrating the cardboard blank.

With particular reference to FIG. 13, the first longitudinal end (2a) is opposite the second longitudinal end (2b).

The main portion (16) can be interposed between the first lateral portion (17) and the second lateral portion (18).

The third lateral portion (19) can be interposed between the first auxiliary portion (20) and the second auxiliary portion (21).

The fourth lateral portion (22) can be interposed between the third auxiliary portion (23) and the fourth auxiliary portion (24).

The main portion (16) can be interposed between the third lateral portion (19) and the fourth lateral portion (22).

The first incision (25) can be such as to extend from the point of intersection of the first longitudinal score line (9) and the first transversal score line (11) according to an inclined trajectory with respect to the first longitudinal score line (9).

The second incision (26) can be such as to extend from the point of intersection of the first longitudinal score line (9) and the second transversal score line (12) according to an inclined trajectory with respect to the first longitudinal score line (9).

The third incision (27) can be such as to extend from the point of intersection of the second longitudinal score line (10) and the first transversal score line (11) according to an inclined trajectory with respect to the second longitudinal score line (10).

The fourth incision (28) can be such as to extend from the point of intersection of the second longitudinal score line (10) and the second transversal score line (12) according to an inclined trajectory with respect to the second longitudinal score line (10).

The first incision (25) can have a smaller depth with respect to the thickness (S) of the cardboard blank (2) for packaging so as to identify a respective fold line (see FIGS. 6-8, 13).

The second incision (26) can have a smaller depth with respect to the thickness (S) of the cardboard blank (2) for packaging so as to identify a respective fold line. The third incision (27) can have a smaller depth with respect to the thickness (S) of the cardboard blank (2) for packaging so as to identify a respective fold line. The fourth incision (28) can have a smaller depth with respect to the thickness (S) of the cardboard blank (2) for packaging so as to identify a respective fold line. The relative first part (20a, 21a, 23a, 24a) and the relative second part (20b, 21b, 23b, 24b), of each of the first auxiliary portion (20), second auxiliary portion (21), third auxiliary portion (23) and fourth auxiliary portion (24), when folding can overlap one another, when the first lateral portion (17), the second lateral portion (18), the third lateral portion (19) and the fourth lateral portion (22) position in a straight position with respect to the main portion (16).

The first abutting flap (29), the second abutting flap (30), the third abutting flap (31) and the fourth abutting flap (32) can be projecting towards the group of articles (3a) with respect to the first lateral portion (17), the second lateral portion (18), the third lateral portion (19) and the fourth lateral portion (22).

With particular reference to FIGS. 6-9, when the group of articles (3a) is released onto the main portion (16), and the first lateral portion (17), the second lateral portion (18), the third lateral portion (19) and the fourth lateral portion (22) are folded towards the group of articles (3a), once the forming of the first abutting flap (29), second abutting flap (30), third abutting flap (31), and fourth abutting flap (32) has taken place, these will abut the group of articles (3a), which, according to the rest base (3b) thereof and the maximum height (3c) thereof, can push the first abutting flap (29), the second abutting flap (30), the third abutting flap (31) and the fourth abutting flap (32) against, respectively, the first lateral portion (17), the second lateral portion (18), the third lateral portion (19) or the fourth lateral portion (22).

In other words, the first abutting flap (29), the second abutting flap (30), the third abutting flap (31) and the fourth abutting flap (32) can abut the group of articles (3a), which, according to the dimensions thereof and the position thereof, when received on the main portion (16), can push: the first abutting flap (29) to near it to the first lateral portion (17) or to the third lateral portion (19); the second abutting flap (30) to near it to the second lateral portion (19) or to the third lateral portion (18); the third abutting flap (31) to near it to the first lateral portion (17) or to the third lateral portion (19); the fourth abutting flap (32) to near it to the third lateral portion (19) or to the second lateral portion (18).

The first lateral portion (17), the second lateral portion (18), the third lateral portion (19) and the fourth lateral portion (22) are preferably folded contemporaneously towards the group of articles (3a), with respect to the main portion (16).

In this way the boxing of the group of articles (3a) is advantageously simple and rapid, ensuring the formation, during the step of folding the first lateral portion (17), second lateral portion (18), third lateral portion (19) and fourth lateral portion (22), of the first abutting flap (29), the second abutting flap (30), the third abutting flap (31) and the fourth abutting flap (32).

Alternatively, the first lateral portion (17) and the second lateral portion (18) are contemporaneously folded towards the group of articles (3a), with respect to the main portion (16) and, subsequently, the third lateral portion (19) and the fourth lateral portion (22) are contemporaneously folded towards the group of articles (3a), with respect to the main portion (16).

In this way the forming of the first abutting flap (29), second abutting flap (30), third abutting flap (31), and fourth abutting flap (32) is advantageously facilitated.

The method preferably comprises a step of moving the main portion (16) downwards so as to abut the first lateral portion (17) and the second lateral portion (18) against a first pair of rollers (60) so that the first lateral portion (17) and the second lateral portion (18) are contemporaneously folded towards the group of articles (3a), with respect to the main portion (16), and so as to abut the third lateral portion (19) and the fourth lateral portion (22) against a second pair of rollers (61) so that the third lateral portion (19) and the fourth lateral portion (22) are contemporaneously folded towards the group of articles (3a), with respect to the main portion (16).

The step of folding the first lateral portion (17), second lateral portion (18), third lateral portion (19), and fourth lateral portion (22) is advantageously carried out at the same time as the release of the group of articles (3a) from the reusable crate (4), moving the main portion (16) downwards.

The cardboard blank (2) preferably comprises a third transversal score line (33) which is parallel and adjacent to the second transversal score line (12) so that the following are identified:

in the central sector (13), a fifth lateral portion (34) that is adjacent to the second lateral portion (18);
in the first lateral sector (14), a first flap (35) that is adjacent to the second auxiliary portion (21);
in the second lateral sector (15), a second flap (36) that is adjacent to the fourth auxiliary portion (24).

The cardboard blank (2) further comprises:
a first cut (37) on the first lateral sector (14), which extends, in a transversal direction, from the first longitudinal end (2a) of the cardboard blank (2) to the first longitudinal score line (9) so as to separate the first flap (35) from the second auxiliary portion (21);
a second cut (38) on the second lateral sector (15), which extends, in a transversal direction, from the second longitudinal end (2) of the cardboard blank (2) to the second longitudinal score line (10) so as to separate the second flap (36) from the fourth auxiliary portion (24); and wherein the method comprises steps of folding the fifth lateral portion (34) so as to superiorly cover the group of articles (3a), when received by the main portion (16).

The fifth lateral portion (34) can be folded towards the second lateral portion (18) with respect to the third transversal score line (33) so as to cover the face above the group of articles (3a) when received on the main portion (16) (see FIGS. 9-12).

The fifth lateral portion (34) advantageously superiorly covers the group of articles (3a) when arranged on the main portion (16).

Further, the first flap (35) and the second flap (36) increase the rigidity of the box (1) that is obtained with the cardboard blank (2), when they are superposed, respectively on the third lateral portion (19) and the fourth lateral portion (22), during the boxing operations of the group of articles (3a) (see FIGS. 9-12).

By increasing the rigidity of the box (1) obtained with this cardboard blank (2), it will be possible to superpose a larger number of boxes on one another and maximise the storage capacity of a store or a truck for transport thereof. Further, by increasing the rigidity of the box (1), a greater safety of the group of articles (3a) present inside it will be ensured, as with a stiff box (1), which is less affected by external actions, the possibility for the external actions to impact on the group of articles (3a) inside the box will be reduced.

The fifth lateral portion (34) can comprise a contact portion (40), which contact portion (40) is arranged at the free end of the fifth lateral portion (34) to contact the first lateral portion (17), when the fifth lateral portion (34) has been folded to superiorly cover the group of articles (3a) arranged on the main portion (16).

The first cut (37) and the second cut (38) have a depth that is equal to the thickness (S) of the cardboard blank (2) for packaging.

In this way, the first cut (37) ensures the separation of the first flap (35) from second auxiliary portion (21) and the second cut (38) ensures the separation of the second flap (36) from the fourth auxiliary portion (24).

The following includes a description of a machine (100) for realising a box (1) starting from a cardboard blank (2) and for boxing a plurality of articles (3) with the box (1), comprising: a conveyor belt (42) for transporting a reusable crate (4) in which a plurality of articles (3) to be boxed is arranged, having an openable bottom (6) and a movable wall (7); the movable wall (7) being movable so as to abut the articles of the plurality of articles (3), so as to flank them to one another to form a group of articles (3a); wherein the articles of the plurality of articles (3), when flanked to one another, define a rest base (3b) and a maximum height (3c); a detecting sensor (43) for detecting the value of the volume (V) occupied by the group of articles (3a) internally of the reusable crate (4), on the basis of the dimensions of the rest base (3b) and the maximum height (3c); supply means (44) for infeeding the cardboard blank (2), on the basis of the value of the volume (V) detected. The cardboard blank (2) comprises:

a first longitudinal score line (9) and a second longitudinal score line (10), parallel to one another, and a first transversal score line (11) and a second transversal score line (12), parallel to one another and perpendicular to the first longitudinal score line (9) and to the second longitudinal score line (10), so as to define, on the cardboard blank (2):

a central sector (13) comprised between the first longitudinal score line (9) and the second longitudinal score line (10); a first lateral sector (14) comprised between the first longitudinal score line (9) and a first longitudinal end (2a) of the cardboard blank (2); a second lateral sector (15) comprised between the second longitudinal score line (10) and a second longitudinal end (2b) of the cardboard blank (2).

The two longitudinal score lines (9, 10) and the two transversal score lines (11, 12) respectively crossing, longitudinally and transversally, the cardboard blank (2) in such a way as to identify in the central sector (13):

a main portion (16), which is comprised between the first transversal score line (11) and the second transversal score line (12) and having dimensions such as to restingly receive the rest base (3b) of the group of articles (3a); a first lateral portion (17) and a second lateral portion (18), on opposite sides of the main portion (16) with respect to the first transversal score line (11) and the second transversal score line (12);

In this way, the following is identified in the first lateral sector (14):

a third lateral portion (19), which is comprised between the first transversal score line (11), the second transversal score line (12), the first longitudinal end (2a) of the cardboard blank (2) and the first longitudinal score line (3); a first auxiliary portion (20) and a second auxiliary portion (21), on opposite sides of the third lateral portion (19), with respect to the first transversal score line (11) and the second transversal score line (12).

Likewise, in the second lateral sector (15) the following are identified:

a fourth lateral portion (22) which is comprised between the first transversal score line (11), the second transversal score line (12), the second longitudinal score line (10) and the second longitudinal end (2b) of the cardboard blank (2); a third auxiliary portion (23) and a fourth auxiliary portion (24), on opposite sides of the fourth lateral portion (22) with respect to the first transversal score line (11) and the second transversal score line (12).

The first lateral portion (17), the second lateral portion (18), the third lateral portion (19) and the fourth lateral portion (22) are such as to extend over all the maximum height (3c) of the group of articles (3a) so as to laterally contain the group of articles (3a) when received by the main portion (16).

The cardboard blank (2) further comprises:
a first incision (25) on the first auxiliary portion (20) starting from the point of intersection between the first longitudinal score line (9) and the first transversal score line (11);
a second incision (26) on the second auxiliary portion (21) starting from the point of intersection between the first longitudinal score line (9) and the second transversal score line (12);
a third incision (27) on the third auxiliary portion (23) starting from the point of intersection between the second longitudinal score line (10) and the first transversal score line (11);
a fourth incision (28) on the fourth auxiliary portion (24) starting from the point of intersection between the second longitudinal score line (10) and the second transversal score line (12).

The first incision (25) subdivides the first auxiliary portion (20) into a first part (20a) and a second part (20b) of the first auxiliary portion (20); the second incision (26) subdivides the second auxiliary portion (21) into a first part (21a) and a second part (21b) of the second auxiliary portion (21); the third incision (27) subdivides the third auxiliary portion (23) into a first part (23a) and a second part (23b) of the third auxiliary portion (23); the fourth incision (28) subdivides the fourth auxiliary portion (24) into a first part (24a) and a second part (24b) of the fourth auxiliary portion (24).

The conveyor belt (42) and the supply means (44) are arranged and configured so as to reciprocally position the cardboard blank (2) and the reusable crate (4) so that the part of reusable crate (4), in which the group of articles (3a) is contained, is located above the main portion (16) so that the openable bottom (6) of the reusable crate (4) can release the group of articles (3a) on the main portion (16).

The machine (100) further comprises:
folding organs (60, 61) for folding the first lateral portion (17), the second lateral portion (18), the third lateral portion (19) and the fourth lateral portion (22) with respect to the main portion (16) towards the group of articles (3a), with the relative first part (20a, 21a, 23a, 24a) and the relative second part (20b, 21b, 23b, 24b) of each of the first auxiliary portion (20), second auxiliary portion (21), third auxiliary portion (23) and fourth auxiliary portion (24), which fold with respect to the first incision (25), second incision (26), third incision (27) and fourth incision (28) so as to form, respectively a first abutting flap (29), a second abutting flap (30), a third abutting flap (31) and a fourth abutting flap (32) so as to abut the group of articles (3a) received on the main portion (16).

The machine (100) carries out the above-described steps of the method of the present invention for realising the above-described box (1).

With reference to the cardboard blank (2), the same considerations apply as above.

The supply means (44) can comprise advancing rollers (48) which advance the cardboard blank (2) along a first advancement direction (Z).

Figure 4:
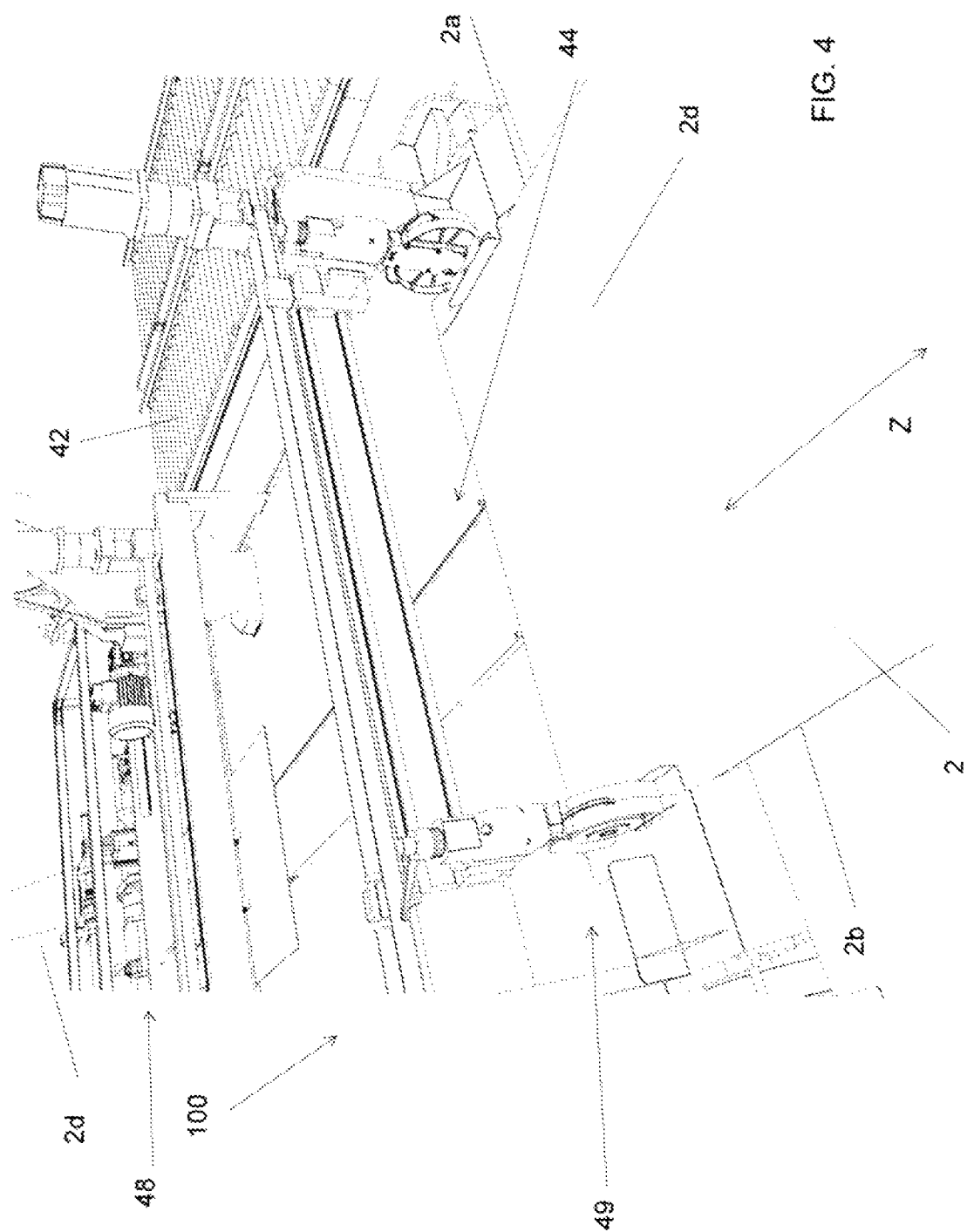
FIG. 4 is a perspective view illustrating the step of the method.

With particular reference to FIG. 4, the cardboard blank (2) can be obtained on the basis of the value of the detected volume (V).

The machine (100) can comprise first cutting means (49) comprising wheels provided with blades.

The first cutting means (49) can longitudinally cut a cardboard strip for packaging (2d), while advancing along the advancement direction (Z), delineating the first longitudinal end (2a) and the second longitudinal end (2b) of the cardboard blank (2).

The wheels provided with blades of the first cutting means (49) can be translatable along a transversal direction to the advancement direction (Z) so as to vary the dimensions of the cardboard blank (2) to be supplied on the basis of the value detected for the volume (V).

With particular reference to FIG. 1, the detecting sensor (43) can be an ultrasound sensor or an optical sensor for detecting the value of the volume (V) occupied by the group of articles (3a) inside the chamber (5) of the reusable crate (4).

With the machine (100), and advantageously, while the first lateral portion (17), the second lateral portion (18), the third lateral portion (19) and the fourth lateral portion (22) are folded with respect to the main portion (16) towards the group of articles (3a), the relative first part (20a, 21a, 23a, 24a) and the relative second part (20b, 21b, 23b, 24b), of each of the first auxiliary portion (20), second auxiliary portion (21), third auxiliary portion (23) and fourth auxiliary portion (24) fold with respect to one another to form a first abutting flap (29), a second abutting flap (30), a third abutting flap (31) and a fourth abutting flap (32), which interpose between the group of articles (3a) and the lateral portions (17, 18, 19, 22) so as to abut the group of articles (3a) arranged on the main portion (16) in order to reduce the movement thereof internally of the box (1).

The folding organs (60, 61) preferably comprise a first pair of rollers (60) and a second pair of rollers (61).

The first pair of rollers (60) is activated so as to contemporaneously fold the first lateral portion (17) and the second lateral portion (18) towards the group of articles (3a), with respect to the main portion (16), when the supply means (44) infeed the cardboard blank (2) so as to arrange the cardboard blank (2) with the first lateral portion (17) facing a roller (60a) of the first pair of rollers (60) and with the second lateral portion (18) facing the other roller (60b) of the first pair of rollers (60). The second pair of rollers (61) is activated so as to contemporaneously fold the third lateral portion (19) and the fourth lateral portion (22) towards the group of articles (3a), with respect to the main portion (16), when the supply means (44) infeed the cardboard blank (2) so as to arrange the cardboard blank (2) with the third lateral portion (19) facing a roller (61a) of the second pair of rollers (61) and with the fourth lateral portion (22) facing the other roller (61b) of the second pair of rollers (61).

The first pair of rollers (60) and the second pair of rollers (61) advantageously facilitate the boxing of the group of articles (3a), making it simple and rapid and ensuring the formation, during the step of folding the first lateral portion (17), second lateral portion (18), third lateral portion (19) and fourth lateral portion (22), of the first abutting flap (29), the second abutting flap (30), the third abutting flap (31) and the fourth abutting flap (32).

The machine (100) preferably comprises aspirating elements (62), which are interposed between the first pair of rollers (60) and the second pair of rollers (61). The supply means (44) are predisposed to arrange the cardboard blank (2) at the aspirating elements (62) so that, when the group of articles (3a) is arranged on the main portion (16), the aspirating elements (62) can grip on the main portion (16) and move the main portion (16) downwards, by effect of the aspirating force, so as to abut the first lateral portion (17) and the second lateral portion (18) against the first pair of rollers (60) and so as to abut the third lateral portion (19) and the fourth lateral portion (22) against the second pair of rollers (61).

When the group of articles (3a) is released onto the main portion (16), the aspirating elements (62) advantageously perform a gripping function on the main portion (16) so that the cardboard blank (2) is moved downwards to abut the first pair of rollers (60) against the first lateral portion (17) and the second lateral portion (18) and the second pair of rollers (61) against the third lateral portion (19) and the fourth lateral portion (22), so that the first lateral portion (17), the second lateral portion (18), the third lateral portion (19) and the fourth lateral portion (22) are folded towards the main portion (16).

The first pair of rollers (60) is preferably translatable along a first direction (X) and the second pair of rollers (61) is translatable along a second direction (X) that is transversal to the first direction (X), so that the first pair of rollers (60) and the second pair of rollers (61) can reciprocally near or distance according to the dimensions of the main portion (16) of the cardboard blank (2) supplied in infeed. The first pair of rollers (60) and the second pair of rollers (61), by translating respective along the first direction (X) and the second direction (Y), advantageously ensure the formation of the box (1) also from cardboard blanks (2) having different dimensions: in fact, the first pair of rollers (60) translates along the direction (X) to abut the first lateral portion (17) and the second lateral portion (18) and, thus to fold them towards the main portion (16), while the second pair of rollers (61) translates along the direction (Y) to abut the third lateral portion (19) and the fourth lateral portion (22) and, thus to fold them towards the main portion (16).

The cardboard blank (2) preferably comprises a third transversal score line (33) which is parallel and adjacent to the second transversal score line (12) so that the following are identified:
  in the central sector (13), a fifth lateral portion (34) that is adjacent to the second lateral portion (18);
  in the first lateral sector (14), a first flap (35) that is adjacent to the second auxiliary portion (21);
  in the second lateral sector (15), a second flap (36) that is adjacent to the fourth auxiliary portion (24);
  the cardboard blank (2) further comprising:
  a first cut (37) on the first lateral sector (14), which extends, in a transversal direction, from the first longitudinal end (2a) of the cardboard blank (2) to the first longitudinal score line (9) so as to separate the first flap (35) from the second auxiliary portion (21);
  a second cut (38) on the second lateral sector (15), which extends, in a transversal direction, from the second longitudinal end (2b) of the cardboard blank (2) to the second longitudinal score line (10) so as to separate the second flap (36) from the fourth auxiliary portion (24); and wherein the roller (60b) of the first pair of rollers (60) abuts the fifth lateral portion (34) so as to fold the fifth lateral portion (34) in order to superiorly cover the group of articles (3a), when received by the main portion (16).

Regarding the advantages linked to the fifth lateral portion (34), the first flap (35) and the second flap (36), these are the same as the considerations made in the foregoing.

The machine (100) can further comprise a gripping arm (50) to pick up the reusable crate from the conveyor belt (42) and position it at the gripping elements (62).

Figure 5:
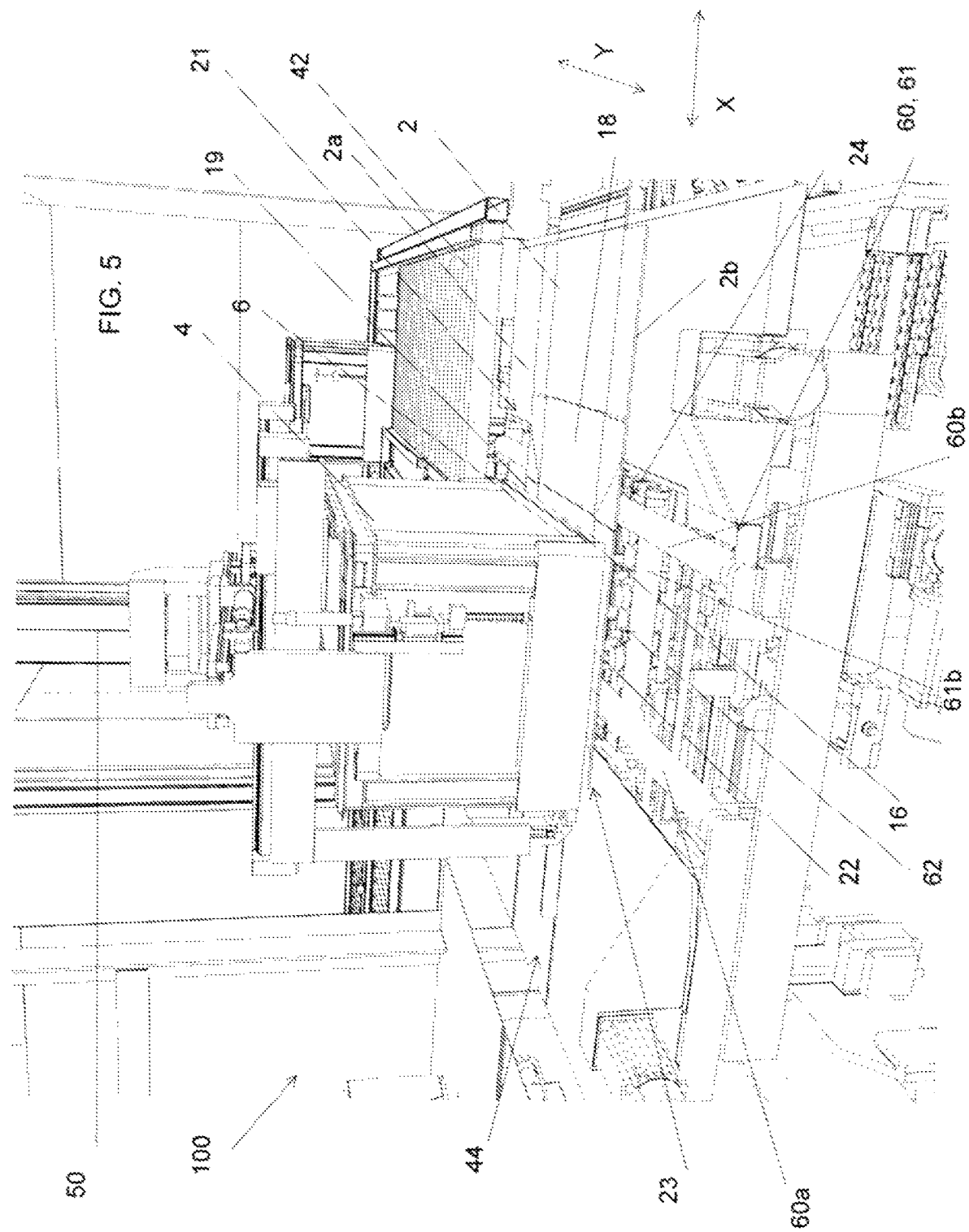
FIGS. 5-9 are perspective views which illustrate further steps of the method.
Figure 6:
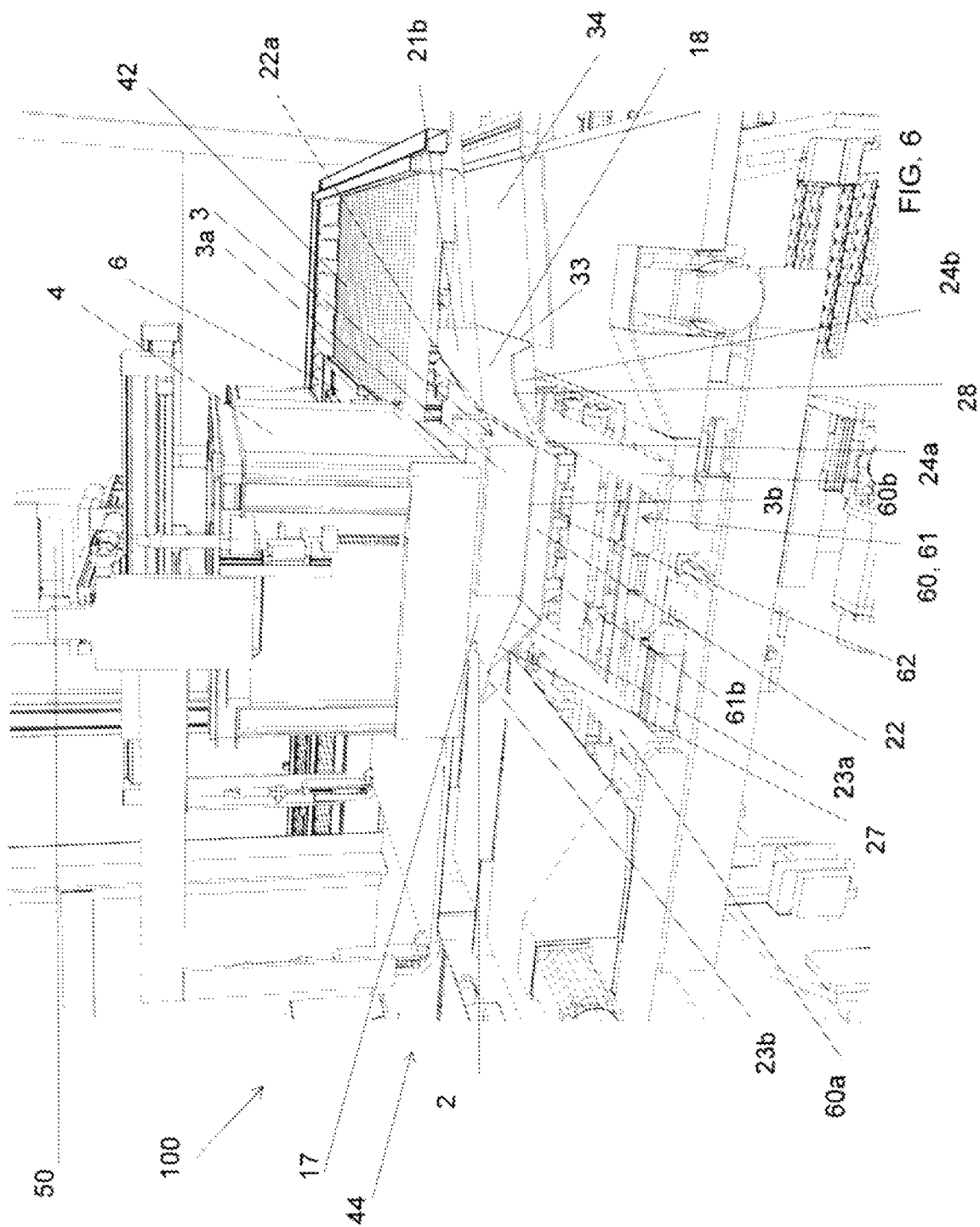
Figure 7:
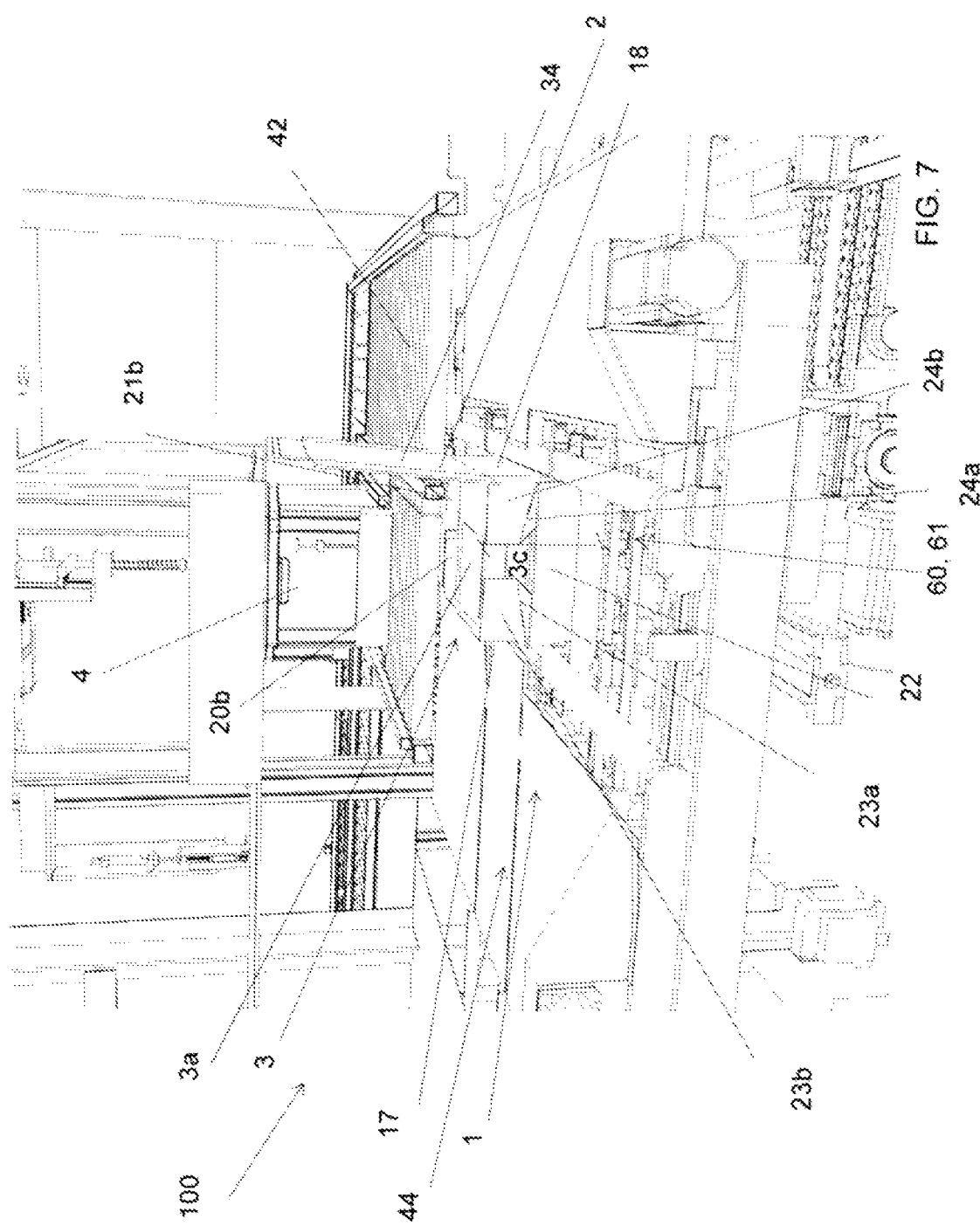
Figure 8:
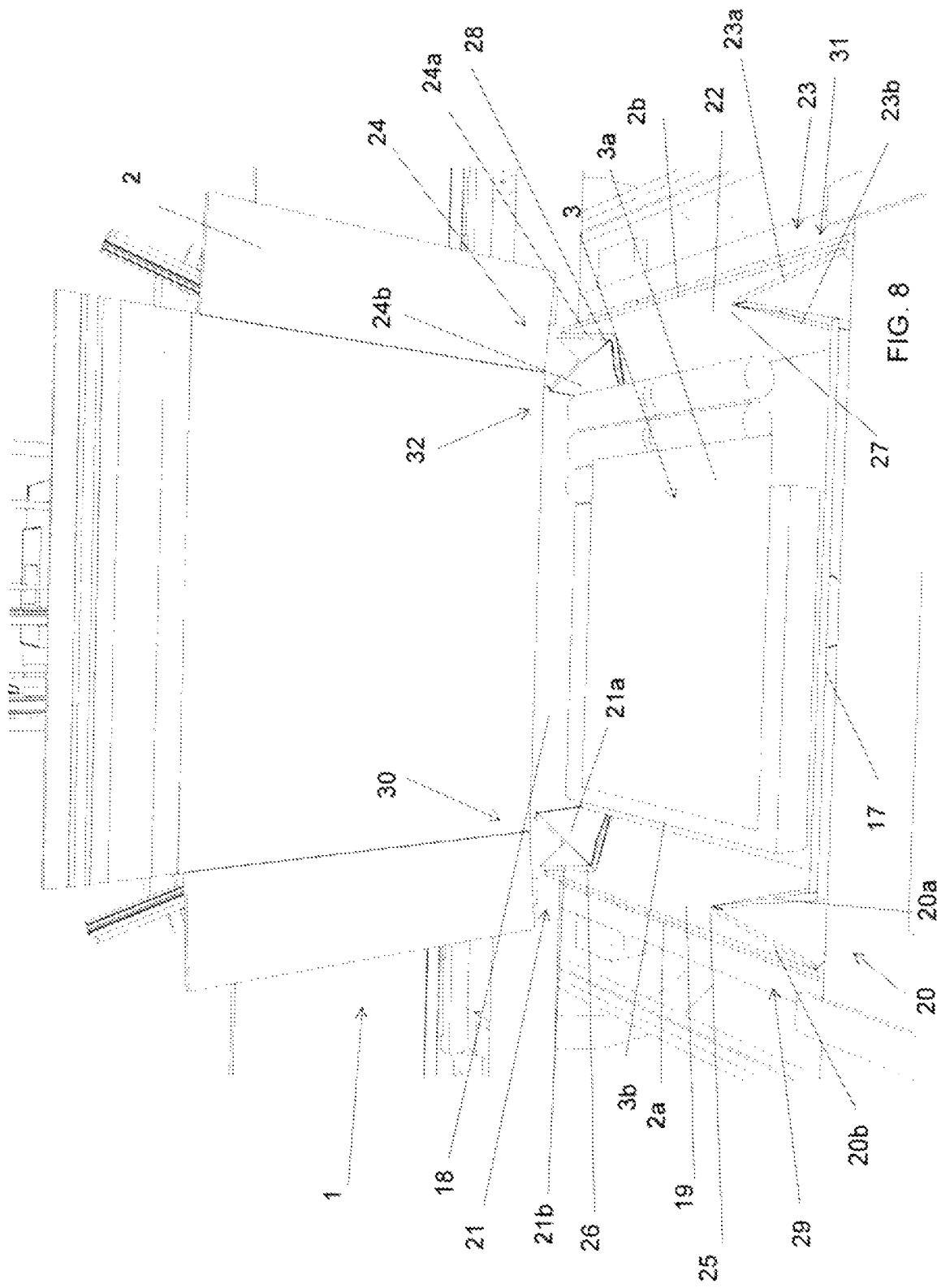
Figure 9:
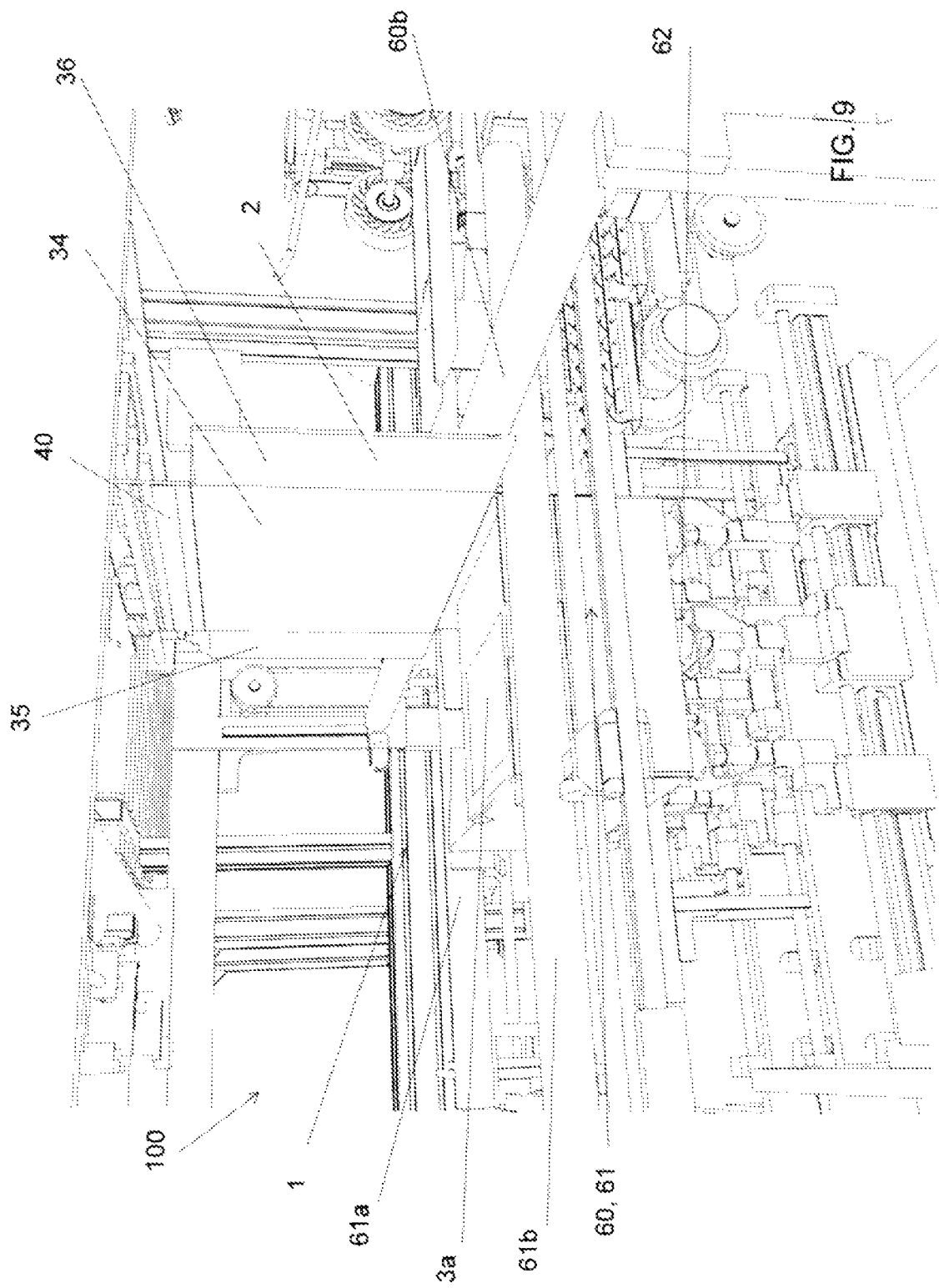
Figure 10:
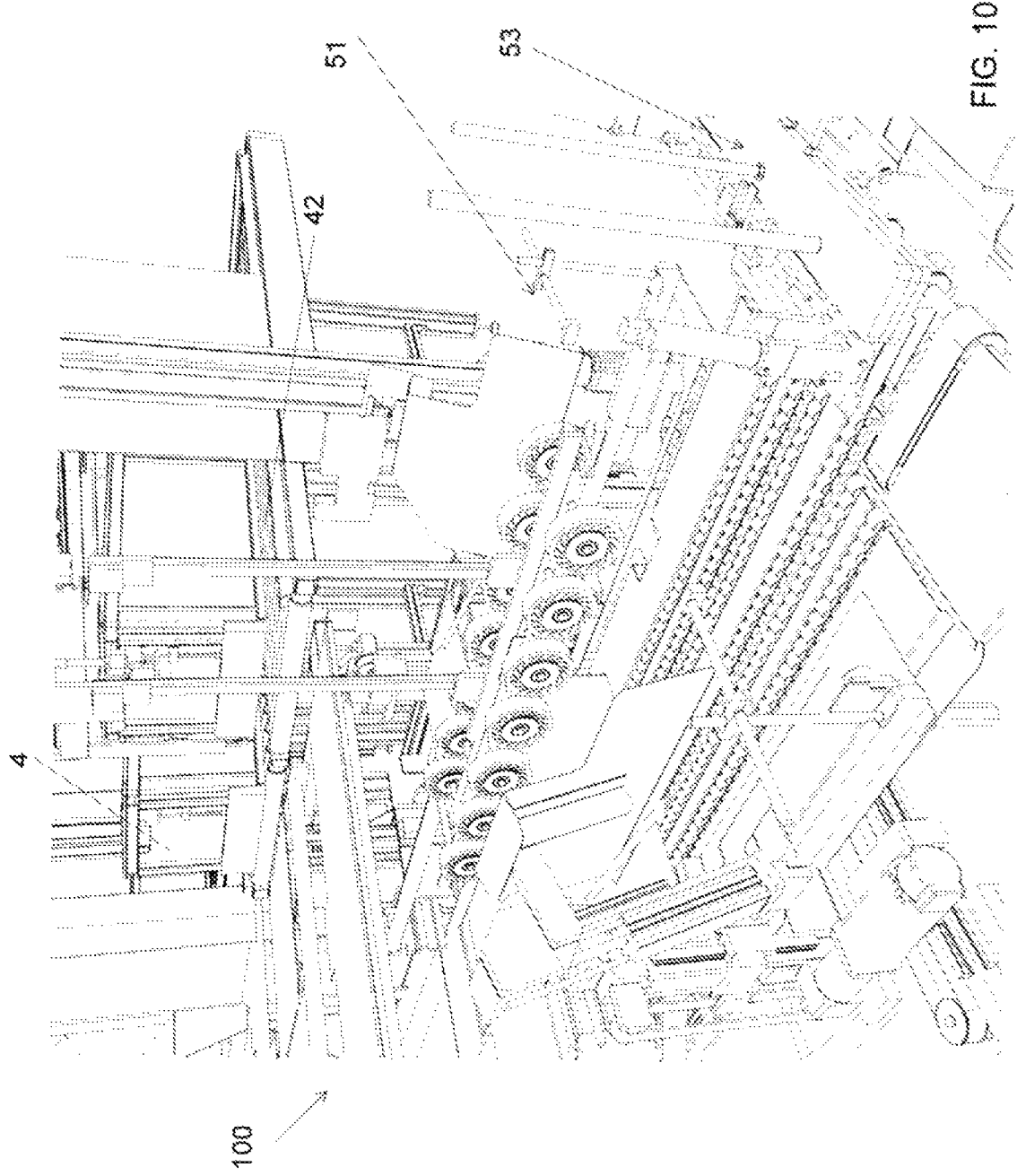
FIGS. 10-12 are perspective views which illustrate further steps of the method.
Figure 11:
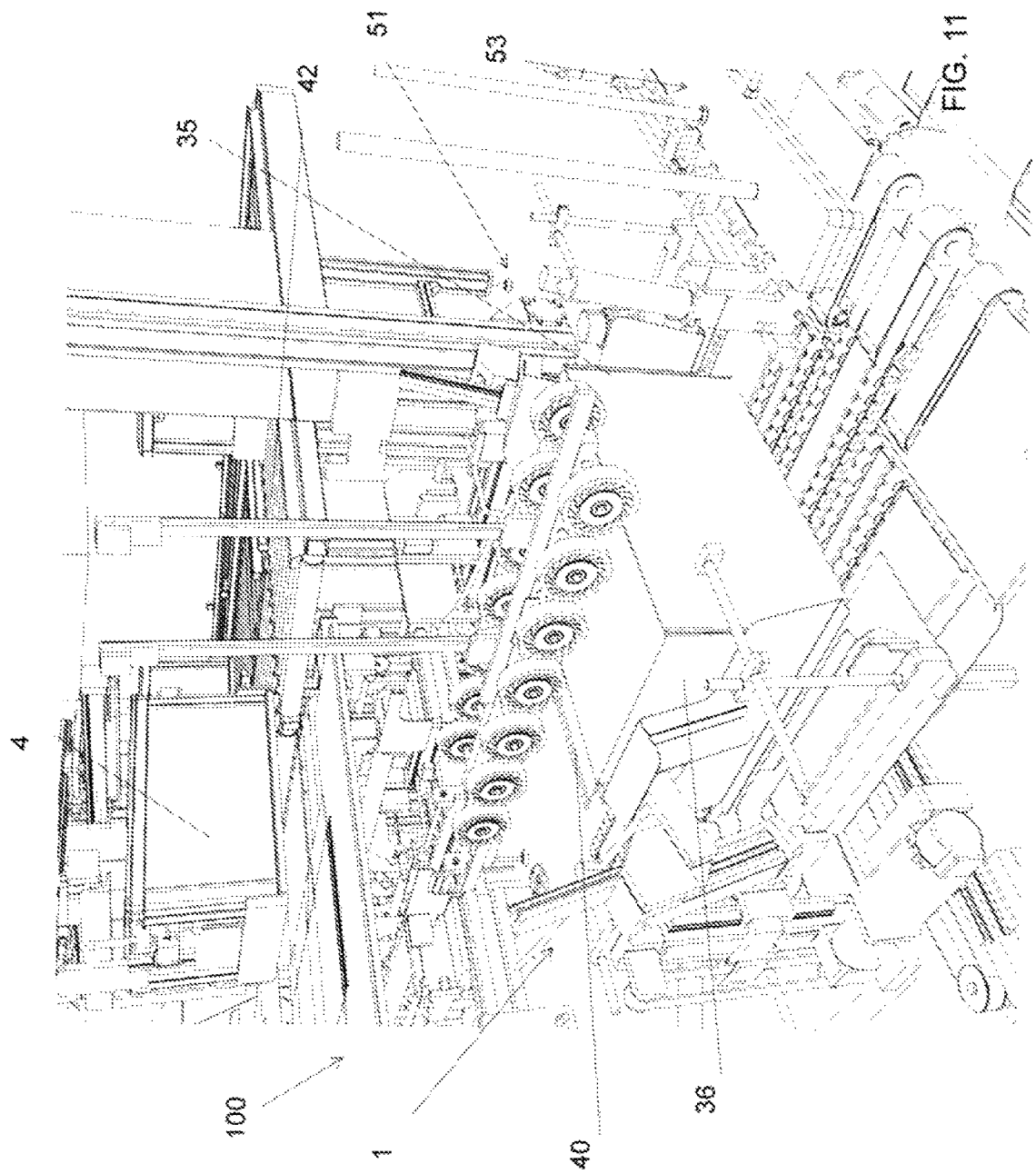

With particular reference to FIGS. 5-7, once the gripping arm positions the reusable crate (4) at the gripping elements (62), they are activated to exert an aspirating action on the main portion (16) so as to move the cardboard blank (2) in a downwards direction.

During this movement downwards of the cardboard blank (2), the first pair of rollers (60) and the second pair of rollers (61) translate respectively along the first direction (X) and the second direction (Y) in order to abut the first lateral portion (17), the second lateral portion (19), the third lateral portion (19) and the fourth lateral portion (22).

Subsequently the second pair of rollers (61) accompanies the cardboard blank (2) during the relative movement of the main portion (16) downwards, like the other roller (60b) of the first pair of rollers (60), so that during the advancement of the cardboard blank (2) along the advancement direction (Z), the other roller (60b) of the first pair of rollers (60) can abut the fifth lateral portion (34) with the aim of superiorly covering the group of articles (3a), when received on the main portion (16), in order to realise the box (1). Further, with particular reference to FIGS. 10 and 11, the machine (100) comprises a pair of pusher elements (51) to fold the first flap (35) and the second flap (36) at the same time towards the third lateral portion (19) and the fourth lateral portion (22), while the cardboard blank (2) advances along the advancement direction (Z).

In particular, the adhesive substance is applied on the external wall of the third lateral portion (19) and the fourth lateral portion (22), so that when the pair of pusher elements (51) folds the first flap (35) and the second flap (36) respectively towards the third lateral portion (19) and the fourth lateral portion (22), the first flap (35) and the second flap (36) remain in adherence to the third lateral portion (19) and fourth lateral portion (22), by effect of the adhesive substance, ensuring the closure of the box (1).

Figure 12:
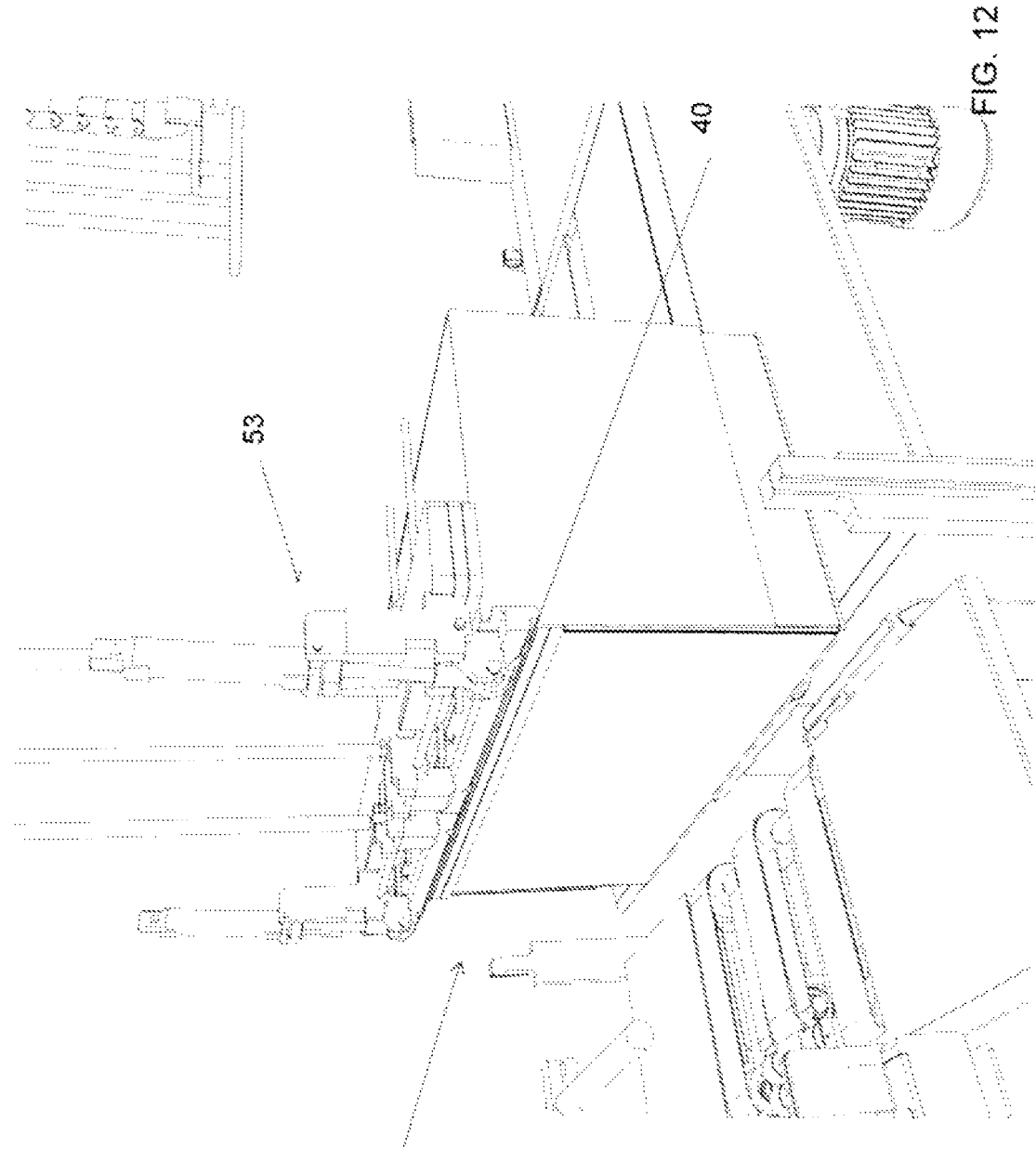

With particular reference to FIG. 12, the machine (100) further comprises a further pusher element (53) for folding the contact portion (40) towards the first lateral portion (17) so that they superpose on one another.

In particular, the pusher element (53) is activated first to apply a grip on the box (1) so as to maintain the box (1) in the closed configuration and, subsequently an adhesive substance is applied at the first lateral portion (17) so that, when the pusher element (53) folds the contact portion (40) towards the first lateral portion (17), the contact portion (40) remains in adherence to the first lateral portion (17) by effect of the adhesive substance, ensuring the closure of the box (1).

The invention claimed is:

1. A method for realising a box starting from a cardboard blank and for boxing a plurality of articles with the box, comprising steps of:
predisposing a reusable crate, having an openable bottom and a movable wall;
arranging a plurality of articles to be boxed in the reusable crate and moving the movable wall to abut the articles of the plurality of articles so as to flank them to one another to form a group of articles;
wherein the articles of the plurality of articles, when flanked to one another, define a rest base and a maximum height;
detecting the value of the volume occupied by the group of articles internally of the reusable crate, on the basis of the dimensions of the rest base and the maximum height;
on the basis of the value of the volume detected, infeeding a cardboard blank comprising:
a first longitudinal score line and a second longitudinal score line, parallel to one another, and a first transversal score line and a second transversal score line, parallel to one another and perpendicular to the first longitudinal score line and to the second longitudinal score line, so as to define, on the cardboard blank:
a central sector comprised between the first longitudinal score line and the second longitudinal score line;
a first lateral sector comprised between the first longitudinal score line and a first longitudinal end of the cardboard blank; and
a second lateral sector comprised between the second longitudinal score line and a second longitudinal end of the cardboard blank;
the two longitudinal score lines and the two transversal score lines respectively crossing, longitudinally and transversally, the cardboard blank and being distanced so as:
to identify in the central sector:
a main portion, which is comprised between the first transversal score line and the second transversal score line and having dimensions such as to restingly receive the rest base of the group of articles;
a first lateral portion and a second lateral portion, on opposite sides of the main portion with respect to the first transversal score line and to the second transversal score line;
to identify in the first lateral sector:
a third lateral portion, which is comprised between the first transversal score line, the second transversal score line, the first longitudinal end of the cardboard blank and the first longitudinal score line; and
a first auxiliary portion and a second auxiliary portion, on opposite sides of the third lateral portion, with respect to the first transversal score line and the second transversal score line;
to identify in the second lateral sector:
a fourth lateral portion, which is comprised between the first transversal score line, the second transversal score line, the second longitudinal score line and the second longitudinal end of the cardboard blank; and
a third auxiliary portion and a fourth auxiliary portion, on opposite sides of the fourth lateral portion, with respect to the first transversal score line and the second transversal score line;
the first lateral portion, the second lateral portion, the third lateral portion and the fourth lateral portion being such as to extend over all the maximum height of the group of articles so as to laterally contain the group of articles when received by the main portion;
the cardboard blank further comprising:
a first incision on the first auxiliary portion starting from the point of intersection between the first longitudinal score line and the first transversal score line;
a second incision on the second auxiliary portion starting from the point of intersection between the first longitudinal score line and the second transversal score line;
a third incision on the third auxiliary portion starting from the point of intersection between the second longitudinal score line and the first transversal score line; and
a fourth incision on the fourth auxiliary portion starting from the point of intersection between the second longitudinal score line and the second transversal score line;
the first incision subdividing the first auxiliary portion into a first part and a second part of the first auxiliary portion;

the second incision subdividing the second auxiliary portion into a first part and a second part of the second auxiliary portion;

the third incision subdividing the third auxiliary portion into a first part and a second part of the third auxiliary portion; and the fourth incision subdividing the fourth auxiliary portion into a first part and a second part of the fourth auxiliary portion;

further comprising:

reciprocally positioning the cardboard blank and the reusable crate so that the part of reusable crate in which the group of articles is contained is located above the main portion;

opening the openable bottom of the reusable crate to release the group of articles on the main portion; and folding the first lateral portion, the second lateral portion, the third lateral portion and the fourth lateral portion with respect to the main portion towards the group of articles, with the respective first part and the respective second part, of each of the first auxiliary portion, second auxiliary portion, third auxiliary portion and fourth auxiliary portion, which fold with respect to the first incision, second incision, third incision and fourth incision so as to form, respectively, a first abutting flap, a second abutting flap, a third abutting flap and a fourth abutting flap so as to abut the group of articles received on the main portion and to reduce the movement thereof inside the box, the first abutting flap, the second abutting flap, the third abutting flap and the fourth abutting flap being projecting towards and applying inwardly-directed pressure against the group of articles with respect to the first lateral portion, the second lateral portion, the third lateral portion and the fourth lateral portion.

2. The method of claim 1, wherein the first lateral portion, the second lateral portion, the third lateral portion and the fourth lateral portion are folded contemporaneously towards the group of articles, with respect to the main portion.

3. The method of claim 1, wherein the first lateral portion and the second lateral portion are contemporaneously folded towards the group of articles, with respect to the main portion and, subsequently, the third lateral portion and the fourth lateral portion are contemporaneously folded towards the group of articles, with respect to the main portion.

4. The method of claim 1, further comprising a step of moving the main portion downwards so as to abut the first lateral portion and the second lateral portion against a first pair of rollers so that the first lateral portion and the second lateral portion are contemporaneously folded towards the group of articles, with respect to the main portion, and so as to abut the third lateral portion and the fourth lateral portion against a second pair of rollers so that the third lateral portion and the fourth lateral portion are contemporaneously folded towards the group of articles, with respect to the main portion.

5. The method of claim 1, wherein the cardboard blank comprises a third transversal score line which is parallel and adjacent to the second transversal score line, so that the following are identified:

in the central sector, a fifth lateral portion that is adjacent to the second lateral portion;

in the first lateral sector, a first flap that is adjacent to the second auxiliary portion; and in the second lateral sector, a second flap that is adjacent to the fourth auxiliary portion;

the cardboard blank further comprising:

a first cut on the first lateral sector, which extends, in a transversal direction, from the first longitudinal end of the cardboard blank to the first longitudinal score line so as to separate the first flap from the second auxiliary portion; and a second cut on the second lateral sector, which extends, in a transversal direction, from the second longitudinal end of the cardboard blank to the second longitudinal score line so as to separate the second flap from the fourth auxiliary portion;

and wherein the method further comprises steps of folding the fifth lateral portion so as to superiorly cover the group of articles, when received by the main portion.

6. The method of claim 1, wherein when the group of articles is released onto the main portion, and the first lateral portion, the second lateral portion, the third lateral portion and the fourth lateral portion are folded towards the group of articles, the first abutting flap, second abutting flap, third abutting flap, and fourth abutting flap will abut the group of articles, which, according to the rest base thereof and the maximum height thereof, pushes the first abutting flap, the second abutting flap, the third abutting flap and the fourth abutting flap against, respectively, the first lateral portion, the second lateral portion, the third lateral portion or the fourth lateral portion.

7. A machine for realising a box starting from a cardboard blank and for boxing a plurality of articles with the box, comprising:

a conveyor belt for transporting a reusable crate in which a plurality of articles to be boxed is arranged, having an openable bottom and a movable wall;

the movable wall being movable so as to abut the articles of the plurality of articles, so as to flank them to one another to form a group of articles;

wherein the articles of the plurality of articles, when flanked to one another, define a rest base and a maximum height;

a detecting sensor for detecting the value of the volume occupied by the group of articles internally of the reusable crate, on the basis of the dimensions of the rest base and the maximum height;

supply means for infeeding the cardboard blank, on the basis of the value of the volume detected, comprising:

a first longitudinal score line and a second longitudinal score line, parallel to one another, and a first transversal score line and a second transversal score line, parallel to one another and perpendicular to the first longitudinal score line and to the second longitudinal score line, so as to define, on the cardboard blank:

a central sector comprised between the first longitudinal score line and the second longitudinal score line;

a first lateral sector comprised between the first longitudinal score line and a first longitudinal end of the cardboard blank; and a second lateral sector comprised between the second longitudinal score line and a second longitudinal end of the cardboard blank;

the two longitudinal score lines and the two transversal score lines respectively crossing, longitudinally and transversally, the cardboard blank in such a way as:

to identify in the central sector:

a main portion, which is comprised between the first transversal score line and the second transversal score line and having dimensions such as to restingly receive the rest base of the group of articles; and a first lateral portion and a second lateral portion, on opposite sides of the main portion with respect to the first transversal score line and the second transversal score line;

to identify in the first lateral sector:

a third lateral portion, which is comprised between the first transversal score line, the second transversal score line, the first longitudinal end of the cardboard blank and the first longitudinal score line; and a first auxiliary portion and a second auxiliary portion, on opposite sides of the third lateral portion, with respect to the first transversal score line and the second transversal score line; and to identify in the second lateral sector:

a fourth lateral portion which is comprised between the first transversal score line, the second transversal score line, the second longitudinal score line and the second longitudinal end of the cardboard blank; and a third auxiliary portion and a fourth auxiliary portion, on opposite sides of the fourth lateral portion with respect to the first transversal score line and the second transversal score line;

the first lateral portion, the second lateral portion, the third lateral portion and the fourth lateral portion being such as to extend over all the maximum height of the group of articles so as to laterally contain the group of articles when received by the main portion;

the cardboard blank further comprising:

a first incision on the first auxiliary portion starting from the point of intersection between the first longitudinal score line and the first transversal score line;

a second incision on the second auxiliary portion starting from the point of intersection between the first longitudinal score line and the second transversal score line;

a third incision on the third auxiliary portion starting from the point of intersection between the second longitudinal score line and the first transversal score line; and a fourth incision on the fourth auxiliary portion starting from the point of intersection between the second longitudinal score line and the second transversal score line;

the first incision subdividing the first auxiliary portion into a first part and a second part of the first auxiliary portion; the second incision subdividing the second auxiliary portion into a first part and a second part of the second auxiliary portion; the third incision subdividing the third auxiliary portion into a first part and a second part of the third auxiliary portion; and the fourth incision subdividing the fourth auxiliary portion into a first part and a second part of the fourth auxiliary portion;

the conveyor belt and the supply means being arranged and configured so as to reciprocally position the cardboard blank and the reusable crate so that the part of reusable crate, in which the group of articles is contained, is located above the main portion so that the openable bottom of the reusable crate can release the group of articles on the main portion;

folding organs for folding the first lateral portion, the second lateral portion, the third lateral portion and the fourth lateral portion with respect to the main portion towards the group of articles, with the respective first part and the respective second part of each of the first auxiliary portion, second auxiliary portion, third auxiliary portion and fourth auxiliary portion, which fold with respect to the first incision, second incision, third incision and fourth incision so as to form, respectively a first abutting flap, a second abutting flap, a third abutting flap and a fourth abutting flap so as to abut the group of articles received on the main portion and to reduce the movement thereof inside the box, the first abutting flap, the second abutting flap, the third abutting flap and the fourth abutting flap each projecting towards and applying inwardly-directed pressure against the group of articles with respect to the first lateral portion, the second lateral portion, the third lateral portion and the fourth lateral portion.

8. The machine of claim 7, wherein the folding organs comprise a first pair of rollers and a second pair of rollers and wherein:

the first pair of rollers is activated so as to contemporaneously fold the first lateral portion and the second lateral portion towards the group of articles, with respect to the main portion, when the supply means infeed the cardboard blank so as to arrange the cardboard blank with the first lateral portion facing a roller of the first pair of rollers and with the second lateral portion facing the other roller of the first pair of rollers; and the second pair of rollers is activated so as to contemporaneously fold the third lateral portion and the fourth lateral portion towards the group of articles, with respect to the main portion, when the supply means infeed the cardboard blank so as to arrange the cardboard blank with the third lateral portion facing a roller of the second pair of rollers and with the fourth lateral portion facing the other roller of the second pair of rollers.

9. The machine of claim 8, further comprising aspirating elements, which are interposed between the first pair of rollers and the second pair of rollers;

and wherein the supply means are predisposed to arrange the cardboard blank at the aspirating elements so that, when the group of articles is arranged on the main portion, the aspirating elements can grip on the main portion and move the main portion downwards, by effect of an aspirating force, so as to abut the first lateral portion and the second lateral portion against the first pair of rollers and so as to abut the third lateral portion and the fourth lateral portion against the second pair of rollers.

10. The machine of claim 8, wherein the first pair of rollers is translatable along a first direction and the second pair of rollers is translatable along a second direction that is transversal to the first direction, so that the first pair of rollers and the second pair of rollers can reciprocally near or distance according to the dimensions of the main portion of the cardboard blank supplied in infeed.

11. The machine of claim 7, wherein the cardboard blank comprises a third transversal score line which is parallel and adjacent to the second transversal score line so that the following are identified:

in the central sector, a fifth lateral portion that is adjacent to the second lateral portion;

in the first lateral sector, a first flap that is adjacent to the second auxiliary portion; and in the second lateral sector, a second flap that is adjacent to the fourth auxiliary portion;

the cardboard blank further comprising:

a first cut on the first lateral sector, which extends, in a transversal direction, from the first longitudinal end of the cardboard blank to the first longitudinal score line so as to separate the first flap from the second auxiliary portion; and a second cut on the second lateral sector, which extends, in a transversal direction, from the second longitudinal end of the cardboard blank to the second longitudinal score line so as to separate the second flap from the fourth auxiliary portion;

and wherein the roller of the first pair of rollers abuts the fifth lateral portion so as to fold the fifth lateral portion in order to superiorly cover the group of articles, when received by the main portion.

\* \* \* \* \*